United States Patent
Maruyama

(10) Patent No.: US 9,751,559 B2
(45) Date of Patent: Sep. 5, 2017

(54) VEHICLE SUPPORT STRUCTURE

(71) Applicant: NISSIN KOGYO CO., LTD., Ueda, Nagano (JP)

(72) Inventor: Yasuhiro Maruyama, Nagano (JP)

(73) Assignee: NISSIN KOGYO CO., LTD., Nagano (JP)

( * ) Notice: Subject to any disclaimer, the term of this patent is extended or adjusted under 35 U.S.C. 154(b) by 0 days.

(21) Appl. No.: 15/059,858

(22) Filed: Mar. 3, 2016

(65) Prior Publication Data
US 2016/0264175 A1 Sep. 15, 2016

(30) Foreign Application Priority Data
Mar. 12, 2015 (JP) ................. 2015-049028

(51) Int. Cl.
*B62D 7/18* (2006.01)

(52) U.S. Cl.
CPC ..................... *B62D 7/18* (2013.01)

(58) Field of Classification Search
CPC ....................................................... B62D 7/18
See application file for complete search history.

(56) References Cited

U.S. PATENT DOCUMENTS

| | | | | |
|---|---|---|---|---|
| 3,908,480 A * | 9/1975 | Afanador | ................ | B62D 7/18 280/93.512 |
| 4,332,500 A * | 6/1982 | Smith, Jr. | ................ | B62D 7/18 403/114 |
| 5,199,730 A * | 4/1993 | Westfall | ................ | B62D 7/18 280/93.512 |
| 5,868,409 A * | 2/1999 | Breuer | ................ | B62D 7/18 280/124.125 |
| 5,975,547 A * | 11/1999 | Stroh | ................ | B62D 7/18 280/93.512 |
| 6,398,240 B1 * | 6/2002 | Taylor | ................ | B60G 3/18 280/93.511 |
| 6,398,241 B1 * | 6/2002 | Mahnig | ................ | F16D 55/00 280/93.512 |
| 6,626,579 B1 * | 9/2003 | Silvasi | ................ | B62D 7/18 384/476 |
| 6,641,229 B1 * | 11/2003 | Kosak | ................ | B60B 35/04 29/520 |
| 6,767,071 B2 * | 7/2004 | Cai | ................ | B23K 20/129 228/2.3 |

(Continued)

FOREIGN PATENT DOCUMENTS

| | | | | |
|---|---|---|---|---|
| DE | EP 0818269 A1 * | 1/1998 | ........... | B23K 20/129 |
| DE | 102007020811 A1 * | 11/2008 | ............. | B60G 7/005 |

(Continued)

OTHER PUBLICATIONS

Japanese Office Action related in Application No. 2015-049028 dated May 29, 2017, 6 pages.

*Primary Examiner* — Laura Freedman
(74) *Attorney, Agent, or Firm* — Andrew M. Calderon; Roberts Mlotkowski Safran Cole & Calderon, P.C.

(57) ABSTRACT

In one embodiment of the invention, a recess portion is formed at an outer end portion of the upper surface of the arm member connecting portion, one end of the recess portion communicates with the counterbored portion, and the other end of the recess portion is opened to an exterior of the arm connecting member.

4 Claims, 3 Drawing Sheets

(56) References Cited

U.S. PATENT DOCUMENTS

| | | | |
|---|---|---|---|
| 7,104,559 B2 * | 9/2006 | Shimosato | B23B 51/105 280/93.512 |
| 7,793,952 B2 * | 9/2010 | Kwon | B62D 7/18 280/93.511 |
| 8,777,241 B1 * | 7/2014 | Hamernik | B60B 35/003 280/93.512 |
| 2004/0188969 A1 * | 9/2004 | Huhn | B62D 7/18 280/93.512 |
| 2009/0103974 A1 * | 4/2009 | Dendis | B62D 7/18 403/135 |

FOREIGN PATENT DOCUMENTS

| | | |
|---|---|---|
| JP | 2001114127 | 4/2001 |
| JP | A201491468 | 5/2014 |

* cited by examiner

VEHICLE SUPPORT STRUCTURE

CROSS-REFERENCE TO RELATED APPLICATION(S)

This application claims priorities from Japanese Patent Application No. 2015-049028 filed on Mar. 12, 2015, the entire contents of which are incorporated herein by reference.

FIELD

The present invention relates to a vehicle support structure having integrally a main body portion on which a vehicle member is mounted and an arm member connecting portion which continues to a lower portion of the main body portion and made of a non-ferrous light alloy. The arm member connecting portion includes a press fitting hole in which a cylindrical member, which connects an arm member and which is made of an iron based metal, is press fitted, while a counterbored portion is formed on an upper surface thereof so that one end of the press fitting hole faces it.

BACKGROUND

As one of vehicle support structures, an aluminum steering knuckle has already been known in JP-A-2014-91468 which has a lower arm connecting portion to which a lower arm is connected.

A steering knuckle transmits a steering or wheel turning force transmitted from a steering arm to a wheel and hence has a complex irregular shape, and therefore, it is general to use a cast product as a steering knuckle. Moreover, a steering knuckle is made of aluminum or a non-ferrous light alloy such as aluminum alloy with a view to reducing the weight thereof so as to realize a reduction in fuel consumption of a vehicle.

Incidentally, to enable a lower arm to be connected to the steering knuckle, an upper surface of the lower arm is counterbored with a T-slot cutter. However, water tends to stay easily in the counterbored portion. On the other hand, with a view to enhancing the connecting rigidity of the lower arm to a lower arm connecting portion of the steering knuckle which is made of the non-ferrous light alloy, in the event that the cylindrical member of the iron based metal is press fitted in the lower arm connecting portion, there are caused fears that an electrochemical corrosion reaction is promoted between the lower arm connecting portion and the cylindrical member by the water staying in the counterbored portion.

SUMMARY

The invention has been made in view of these situations and an object thereof is to provide a vehicle support structure which can restrict the occurrence of electrochemical corrosion between the vehicle support structure which is made of a non-ferrous light alloy and a cylindrical member which is made of an iron based metal.

In a first aspect of the invention, the vehicle support structure formed of a non-ferrous light alloy comprises integrally a main body portion on which a vehicle member is mounted, and an arm member connecting portion which continues to a lower portion of the main body portion so that a press fitting hole is provided into which a cylindrical member, which connects an arm member and which is made of an iron based metal, is press fitted and that a counterbored portion which one end of the press fitting hole faces is formed on an upper surface (a) of the arm member connecting portion. A recess portion is formed at an outer end portion of the upper surface of the arm member connecting portion. One end of the recess portion communicates with the counterbored portion and the other end of the recess portion is opened to an exterior of the arm connecting member.

In a second aspect of the invention, in addition to the first aspect, at least the upper surface (a) of the arm member connecting portion is formed so as to be inclined in such a way as to be lowered as it extends towards an outer end thereof, and the recess portion is formed at a lowermost portion of the upper surface (a).

In a third aspect of the invention, in addition to the first or second aspect, the recess portion is formed so that a bottom surface (a) thereof becomes lower than a bottom surface of the counterbored portion.

In a fourth aspect of the invention, in addition to any one of first to third aspect, the recess portion is formed at the same time as the main body portion and the arm member connecting portion are formed by gravity casting.

According to the first aspect of the invention, the recess portion is formed at the outer end portion of the upper surface of the arm member connecting portion, one end of the recess portion communicates with the counterbored portion, and the other end of the recess portion is opened outwards. Thus, water staying in the counterbored portion can be discharged therefrom, and the generation of electrochemical corrosion between the arm member connecting portion and the cylindrical member can be restricted, thereby making it possible to prevent the occurrence of a reduction in strength attributed to electrochemical corrosion. In addition, as a result of being able to drain the water from the counterbored portion, the thickness of the arm member connecting portion can be increased to thereby enhance the rigidity thereof. Further, any specific surface treatment to prevent electrochemical corrosion does not have to be applied to the cylindrical member, whereby a surface treatment to be applied to the cylindrical member becomes simple, thereby making it possible to realize a reduction in the production cost of the vehicle support structure.

According to the second aspect of the invention, at least the upper surface of the arm member connecting portion is inclined so as to be lowered as it extends towards the outer end thereof, and the recess portion is formed at the lowermost portion of the upper surface of the arm member connecting portion. Thus, the drainage effect of draining the counterbored portion can be enhanced by the recess portion.

According to the third aspect of the invention, the bottom surface of the recess portion is lower than the bottom surface of the counterbored portion, and therefore, water staying in the counterbored portion can be discharged in an ensured fashion.

According to the fourth aspect of the invention, the recess portion can also be formed at the same time as the vehicle support structure is formed by gravity casting, and therefore, the recess portion can be formed easily.

DETAILED DESCRIPTION

Figure 1:
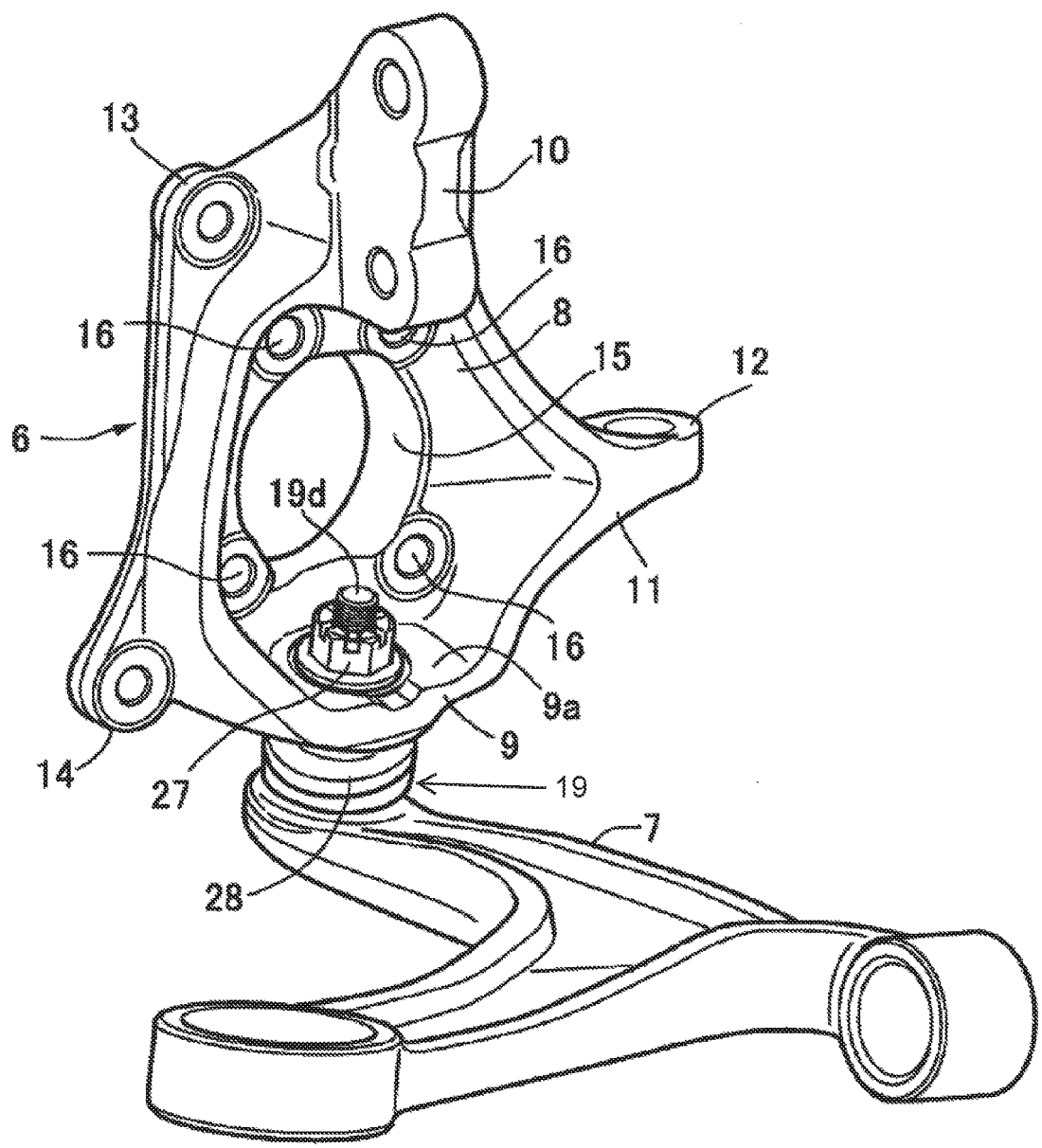
FIG. 1 is a perspective view of a steering knuckle and a lower arm.

Hereinafter, an embodiment of the invention will be described while referring to FIGS. 1 to 3. Firstly, in FIG. 1, for suspension of a front wheel of a four-wheeled vehicle, a wheel hub which supports a front wheel as a wheel support member which is one of vehicle members is mounted on a steering knuckle 6 as a vehicle support structure which is made of aluminum or a non-ferrous light alloy such as aluminum alloy through gravity casting. This steering knuckle 6 has integrally a main body portion 8 on which the wheel hub is mounted, a lower arm connecting portion 9 as an arm member connecting portion which continues to a lower portion of the main body portion 8 in such a way as to connect a lower arm 7 which is an arm member thereto, a damper connecting portion 10 which extends in an up-to-down direction and which is provided at an upper portion of the main body portion 8, an arm portion 11 which extends in a front-to-rear direction and which connects to a middle portion, in relation to the up-to-down direction, of a front portion of the main body portion 8, a tie rod connecting portion 12 which is provided at a distal end of the arm portion 11, and caliper mounting portions 13, 14 which project from two locations on a rear portion of the main body portion 8 which are spaced apart from each other in the up-to-down direction so that a brake caliper, not shown, is mounted thereon.

A circular opening portion 15 where a hub bearing (not shown) is disposed is provided in a central portion of the main body portion 8. Through holes 16 are provided on the main body portion 8 so as to be disposed around the opening portion 15, and bolts (not shown) are inserted through the through holes 16 to mount the wheel hub on the main body portion 8.

The lower arm 7 is connected to the lower arm connecting portion 9 of the steering knuckle 6 via a ball joint (not shown).

Figure 2:
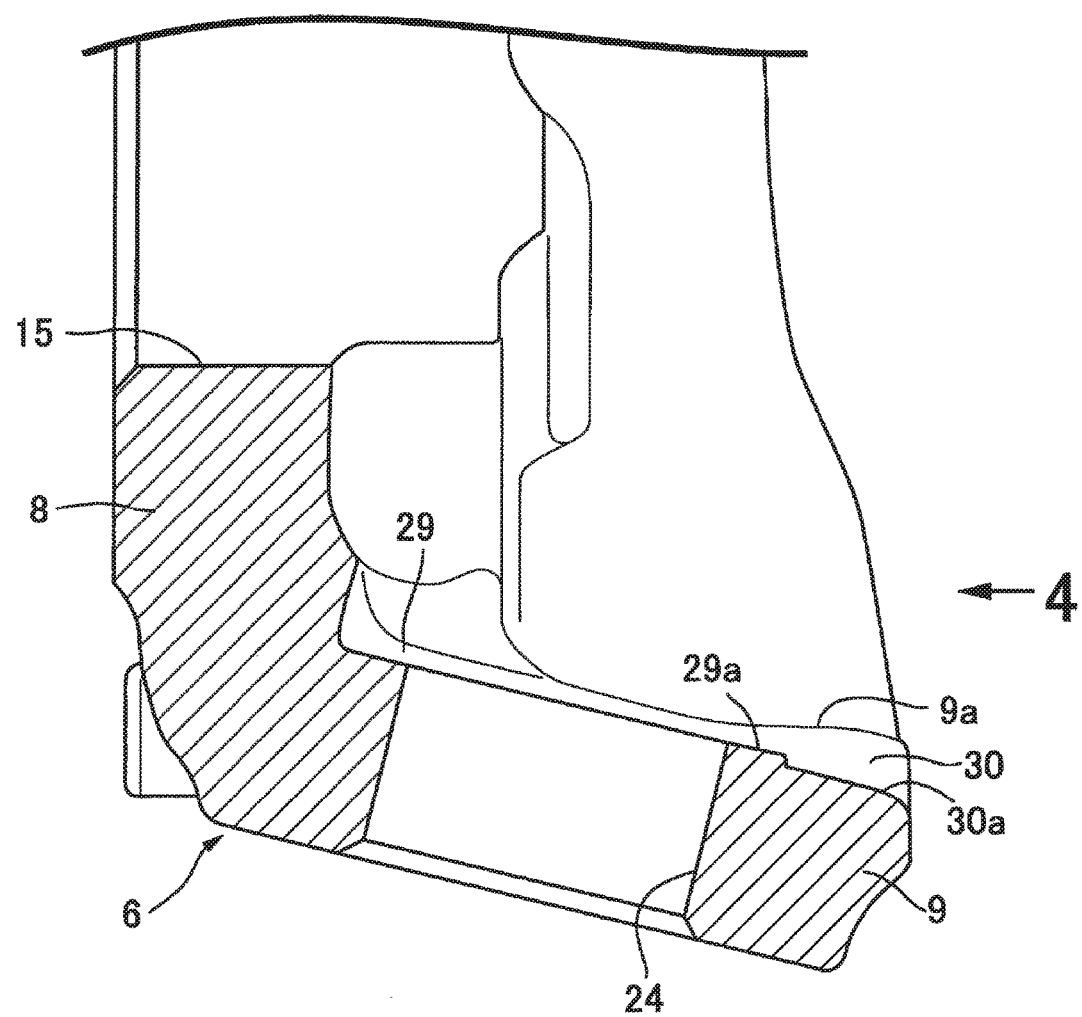
FIG. 2 is an enlarged vertical sectional view of a locker arm connecting portion.

Also, referring to FIGS. 2, a press fitting hole 24 is provided in the lower arm connecting portion 9 so as to extend in the up-to-down direction, and a cylindrical member made of an iron-based metal is press fitted in the press fitting hole 24, and this cylindrical member connects the lower arm 7 to the lower arm connecting portion 9.

A threaded shank portion 19d which continues to the ball joint is inserted into the cylindrical member so that the threaded shank portion 19d projects upwards from the lower arm connecting portions 9. A nut 27 is screwed on to the threaded shank portion 19d, and the lower arm 7 is connected to the lower arm connecting portion 9 via the ball joint by tightening the nut 27. A boot 28 is provided between a lower end portion of the cylindrical member and a distal end portion of the lower arm 7 so as to cover a lower portion of the ball stud 19.

Figure 3:
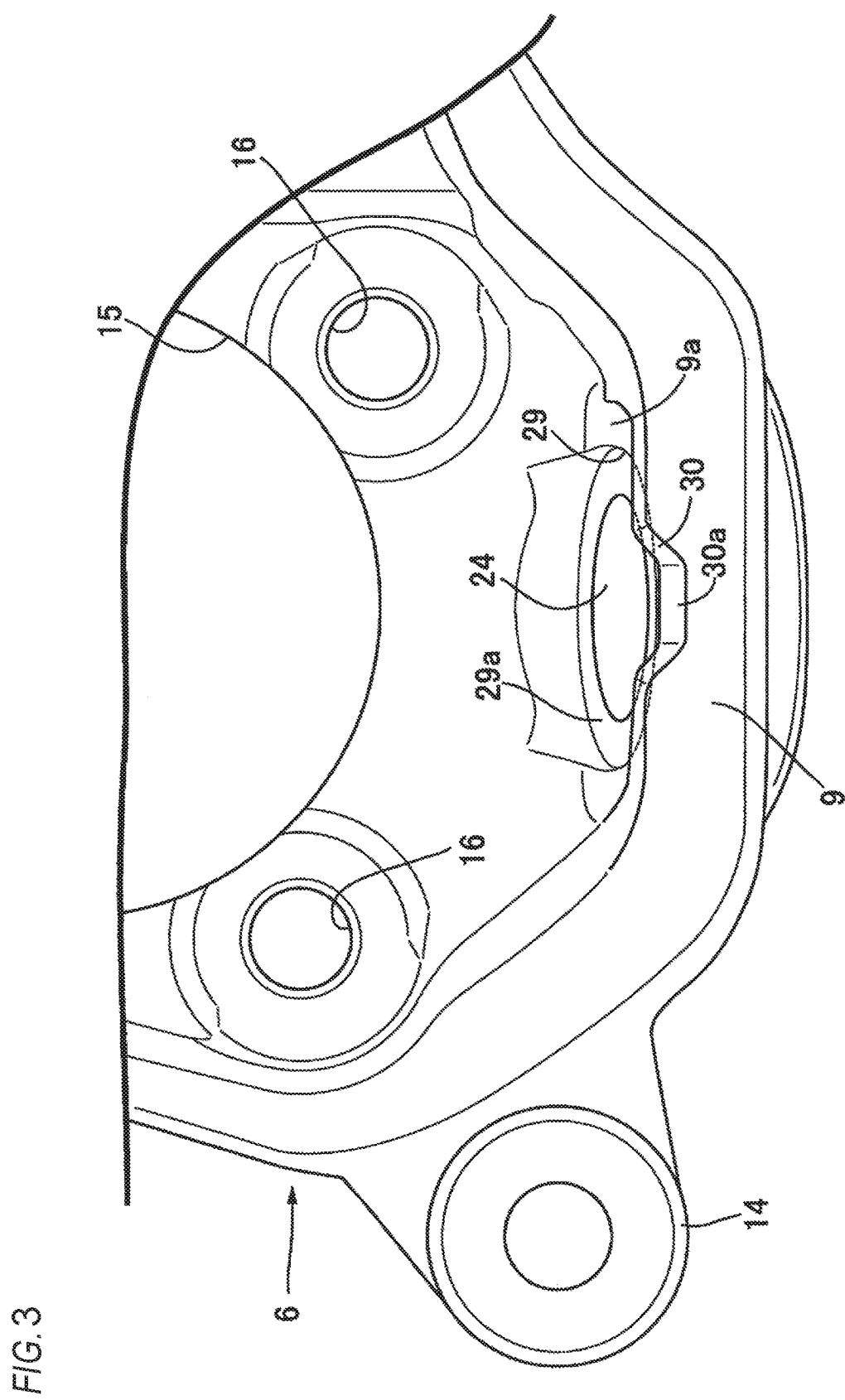
FIG. 3 is a view as seen in the direction of an arrow 3 in FIG. 2.

Also, referring to FIG. 3, a counterbored portion 29 is formed on an upper surface 9a of the lower arm connecting portion 9 so that the nut 27 is brought into abutment and engagement with a bottom surface 29a of the counterbored portion 29 with one end of the press fitting hole 24 facing the counterbored portion 29. A recess portion 30 is formed at an outer end portion of the upper surface 9a of the lower arm connecting portion 9. One end of the recess portion 30 communicates with the counterbored portion 29 and the other end of the recess portion 30 is opened to an exterior of the lower arm connecting portion 9. Moreover, the counterbored portion 29 is formed by machining the upper surface 9a of the lower arm connecting portion 29 with a T-slot cutter after the steering knuckle 6 is cast by gravity casting, while the recess portion 30 is formed at the same time as the steering knuckle 6 is cast by gravity casting.

Incidentally, at least the upper surface 9a of the lower arm connecting portion 9, in this embodiment, the whole of the lower arm connecting portion 9 is formed so as to be inclined to be lowered as it extends towards an outer end thereof, and the recess portion 30 is formed at a lowermost portion of the upper surface 9a.

Moreover, the recess portion 30 is formed so that a bottom surface 30a thereof becomes lower than the bottom surface 29a of the counterbored portion 29.

Next, the function of this embodiment will be described. The lower arm connecting portion 9 is provided so as to continue integrally to the lower portion of the main body portion 8 where the wheel hub is mounted. The press fitting hole 24 is provided in the lower arm connecting portion 9 so that the cylindrical member made of the iron based metal is press fitted into the press fitting hole 24, and this cylindrical member connects the lower arm 7 to the lower arm connecting portion 9. The counterbored portion 29 is formed on the upper surface 9a of the lower arm connecting portion 9, and the one end of the press fitting hole 24 faces the counterbored portion 29. In addition, the recess portion 30, which communicates with the counterbored portion 29 at the one end and which is opened to the exterior of the lower arm connecting portion 9 at the other end, is formed at the outer end portion of the upper surface 9a of the lower arm connecting portion 9. By adopting this configuration, water staying in the counterbored portion 29 can be discharged therefrom by the recess portion 30, so that electrochemical corrosion that would be generated between the lower arm connecting portion 9 and the cylindrical member can be restricted from occurring, thereby making it possible to prevent the occurrence of a reduction in strength which would be triggered by such electrochemical corrosion. In addition, since the water staying in the counterbored portion 29 can be discharged therefrom, the thickness of the lower arm connecting portion 9 can be increased to enhance the rigidity thereof. Further, any specific surface treatment to prevent electrochemical corrosion does not have to be applied to the cylindrical member, whereby a surface treatment to be applied to the cylindrical member can be made simple, thereby making it possible to reduce the production cost of the steering knuckle 6.

At least the upper surface 9a of the lower arm connecting portion 9 is formed to be inclined so as to be lowered as it extends towards the outer end thereof, and the recess portion 30 is formed at the lowermost portion of the upper surface 9a. Thus, the drainage effect on the counterbored portion 29 can be enhanced by the recess portion 30.

The recess portion 30 is formed so that the bottom surface 30a thereof becomes lower than the bottom surface 29a of the counterbored portion 29, whereby water staying in the counterbored portion 29 can be discharged therefrom in an ensured fashion.

The recess portion 30 is formed at the same time as the main body portion 8 and the lower arm connecting portion 9 are cast by gravity casting, thereby making it possible to form the recess portion 30 easily.

Thus, while the embodiment of the invention has been described heretofore, the invention is not limited to the embodiment described above, and hence, various changes in design can be made thereto without departing from the spirit and scope of the invention claimed by claims to be made herebelow.

For example, in the embodiment described above, the vehicle member is the wheel hub as the wheel support member, the arm member is the lower arm 7, and the vehicle support structure is the steering knuckle 6. However, the invention can also be applied to a rear knuckle or an engine mount as a vehicle support structure.

The invention claimed is:

1. A vehicle support structure made of a non-ferrous light alloy comprising integrally:
   a main body portion on which a vehicle member is mounted, and
   an arm member connecting portion which continues to a lower portion of the main body portion so that a press fitting hole is provided into which a cylindrical member, which connects an arm member and which is made of an iron based metal, is press fitted and that a counterbored portion which one end of the press fitting hole faces is formed on an upper surface of the arm member connecting portion, wherein
   a recess portion is formed at an outer end portion of the upper surface of the arm member connecting portion, and
   one end of the recess portion communicates with the counterbored portion and the other end of the recess portion is opened to an exterior of the arm member connecting portion.

2. The vehicle support structure according to claim 1, wherein
   at least the upper surface of the arm member connecting portion is formed so as to be inclined in such a way as to be lowered as it extends towards an outer end thereof, and
   the recess portion is formed at a lowermost portion of the upper surface.

3. The vehicle support structure according to claim 1, wherein
   the recess portion is formed so that a bottom surface thereof becomes lower than a bottom surface of the counterbored portion.

4. The vehicle support structure according to claim 1, wherein
   the recess portion is formed at the same time as the main body portion and the arm member connecting portion which are all formed by gravity casting.

* * * * *